(12) United States Patent
Lee et al.

(10) Patent No.: US 11,114,670 B2
(45) Date of Patent: Sep. 7, 2021

(54) NEGATIVE ELECTRODE AND METHOD FOR PREPARING NEGATIVE ELECTRODE

(71) Applicant: LG CHEM, LTD., Seoul (KR)

(72) Inventors: Su Min Lee, Daejeon (KR); Sun Young Shin, Daejeon (KR); Su Yeon Lee, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 163 days.

(21) Appl. No.: 16/304,998

(22) PCT Filed: Oct. 26, 2017

(86) PCT No.: PCT/KR2017/011918
§ 371 (c)(1),
(2) Date: Nov. 27, 2018

(87) PCT Pub. No.: WO2018/088735
PCT Pub. Date: May 17, 2018

(65) Prior Publication Data
US 2020/0235406 A1 Jul. 23, 2020

(30) Foreign Application Priority Data
Nov. 8, 2016 (KR) .................. 10-2016-0147950

(51) Int. Cl.
*H01M 4/66* (2006.01)
*H01M 4/02* (2006.01)

(52) U.S. Cl.
CPC ...... *H01M 4/663* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 8,637,187 B2 | 1/2014 | Fuse et al. | |
| 8,920,765 B2 | 12/2014 | Sudoh et al. | |
| 2003/0147800 A1 | 8/2003 | Kwon et al. | |
| 2004/0023115 A1* | 2/2004 | Kato | H01M 4/661 429/231.8 |
| 2004/0137328 A1 | 7/2004 | Kim et al. | |
| 2006/0073387 A1* | 4/2006 | Sakagoshi | H01M 4/621 429/231.8 |
| 2008/0038182 A1 | 2/2008 | Kwon et al. | |
| 2008/0274406 A1 | 11/2008 | Fuse et al. | |
| 2009/0162753 A1 | 6/2009 | Kwon et al. | |
| 2010/0209763 A1* | 8/2010 | Okamura | H01M 4/139 429/163 |
| 2011/0171532 A1 | 7/2011 | Okanishi et al. | |
| 2012/0070732 A1 | 3/2012 | Kim et al. | |
| 2014/0011087 A1* | 1/2014 | Ozaki | H01G 11/28 429/211 |
| 2014/0231707 A1 | 8/2014 | Sudoh et al. | |
| 2014/0335428 A1 | 11/2014 | Wakizaka et al. | |
| 2015/0079477 A1* | 3/2015 | Spahr | C01B 32/21 429/231.8 |
| 2016/0190552 A1* | 6/2016 | Murata | H01M 4/366 429/231.8 |
| 2016/0197342 A1* | 7/2016 | Lee | H01M 4/133 429/220 |
| 2017/0179487 A1* | 6/2017 | Takeda | H01M 4/364 |
| 2017/0373314 A1* | 12/2017 | Takeda | H01M 4/625 |

FOREIGN PATENT DOCUMENTS

| | | | | |
|---|---|---|---|---|
| CN | 1228872 C | | 11/2005 | |
| CN | 1808745 A | * | 7/2006 | ............ H01M 4/58 |
| CN | 101174683 A | * | 5/2008 | ........... H01M 4/587 |
| CN | 101174683 A | | 5/2008 | |
| CN | 102067363 A | | 5/2011 | |
| CN | 104364193 A | | 2/2015 | |
| CN | 105152166 A | | 12/2015 | |
| CN | 105453314 A | | 3/2016 | |
| JP | 11-246209 A | | 9/1999 | |
| JP | 2006-49288 A | | 2/2006 | |
| JP | 2010-92649 A | | 4/2010 | |
| JP | 2013-30355 A | | 2/2013 | |
| JP | 2013-127860 A | | 6/2013 | |
| JP | 2013-138025 A | | 7/2013 | |
| KR | 2002-0081132 A | | 10/2002 | |
| KR | 10-2004-0053492 A | | 6/2004 | |
| KR | 10-2005-0094451 A | | 9/2005 | |
| KR | 10-2007-0040853 A | | 4/2007 | |
| KR | 10-0978422 B1 | | 8/2010 | |
| KR | 10-2013-0116038 A | | 10/2013 | |
| KR | 10-1426195 B1 | | 8/2014 | |
| KR | 10-2015-0059135 A | | 5/2015 | |
| KR | 10-1626026 B1 | | 5/2016 | |
| WO | WO 2015/041450 | * | 3/2015 | ............ H01M 4/587 |
| WO | WO 2015/152113 A1 | | 10/2015 | |

OTHER PUBLICATIONS

Zhao et al., "Modification of natural graphite for lithium ion batteries," Solid State Sciences, 10, (2008), 612-617 (Year: 2008).*

(Continued)

*Primary Examiner* — Amanda J Barrow
(74) *Attorney, Agent, or Firm* — Birch, Stewart, Kolasch & Birch, LLP

(57) ABSTRACT

A negative electrode according to one embodiment of the present invention comprises a current collector and a negative electrode active material layer disposed on the current collector, wherein the negative electrode active material layer includes a first particle and a second particle, the first particle includes a first core including artificial graphite; and a first shell disposed on the first core, said first shell including an oxide of the artificial graphite, wherein a sphericity of the first particle measured through a particle shape analyzer is from 0.94 to 0.98, the second particle is artificial graphite having sphericity measured through the particle shape analyzer of 0.70 to 0.92, and a weight ratio of the first particle and the second particle is from 1:1 to 1:9.

15 Claims, No Drawings

(56) References Cited

OTHER PUBLICATIONS

Extended European Search Report, dated Apr. 2, 2019, for European Application No. 17870393.0.
International Search Report for PCT/KR2017/011918 (PCT/ISA/210) dated Feb. 2, 2018.

* cited by examiner

NEGATIVE ELECTRODE AND METHOD FOR PREPARING NEGATIVE ELECTRODE

TECHNICAL FIELD

This application claims priority to and the benefits of Korean Patent Application No. 10-2016-0147950, filed with the Korean Intellectual Property Office on Nov. 8, 2016, the entire contents of which are incorporated herein by reference.

The present invention relates to a negative electrode and a method for preparing the negative electrode, and specifically, the negative electrode includes a first particle having sphericity of 0.94 to 0.98 and a second particle having sphericity of 0.70 to 0.92.

BACKGROUND ART

Demands for the use of alternative energy or clean energy has increased with a rapid increase in the use of fossil fuel, and fields mostly actively studied for its part are fields of power generation and power accumulation using an electrochemical reaction.

Current typical examples of an electrochemical device using such electrochemical energy may include a secondary battery, and the scope of application tends to expand further. As technology developments and demands for portable devices such as portable computers, portable phones or cameras have recently increased, demands for secondary batteries as an energy source have rapidly increased, and among such secondary batteries, lithium secondary batteries with high energy density, that is, high capacity, have been extensively studied, and, in addition thereto, commercialized and widely used.

A secondary battery is generally formed with a positive electrode, a negative electrode, an electrolyte and a separator. Lithium ions coming out of a positive electrode active material by first charge are intercalated into a negative electrode active material such as carbon particles, and deintercalated again when discharged, and charge and discharge become possible since the lithium ions perform a role of transferring energy while going back and forth between the two electrodes. The electrode includes a current collector and an active material layer, and generally uses a binding agent such as a binder in order to increase adhesive strength between the active material and the current collector.

In order to further increase the adhesive strength, technologies of adding a separate additive to electrode slurry or increasing a binder ratio have been introduced in the art. However, when the additive is added or the binder content increases, a content of active material particles decreases leading to a problem of reducing capacity.

Accordingly, development of an electrode capable of securing adhesive strength between an active material and a current collector while maintaining high capacity of a battery has been required.

PRIOR ART DOCUMENTS

Patent Documents (Patent Document 1) Korean Patent Application Laid-Open Publication No. 10-2004-0053492

DISCLOSURE

Technical Problem

An aspect of the present invention provides a negative electrode capable of improving adhesive strength (electrode adhesive strength) between a negative electrode active material layer and a current collector, and a method for preparing the same.

Technical Solution

According to an aspect of the present invention, there is provided a negative electrode comprising a current collector and a negative electrode active material layer disposed on the current collector, wherein the negative electrode active material layer includes a first particle and a second particle, the first particle comprises a first core including artificial graphite; and a first shell disposed on the first core, said first shell including an oxide of the artificial graphite, wherein a sphericity of the first particle measured through a particle shape analyzer is from 0.94 to 0.98, the second particle is artificial graphite having sphericity measured through the particle shape analyzer of 0.70 to 0.92, and a weight ratio of the first particle and the second particle is from 1:1 to 1:9.

According to another aspect of the present invention, there is provided a method for preparing a negative electrode including preparing negative electrode slurry (step 1), and coating the negative electrode slurry on a current collector and then drying the result (step 2), wherein the negative electrode slurry includes a first particle and a second particle, the first particle comprises: a first core including artificial graphite; and a first shell disposed on the first core, said first shell including an oxide of the artificial graphite, wherein a sphericity of the first particle measured through a particle shape analyzer is from 0.94 to 0.98, the second particle is artificial graphite having sphericity measured through the particle shape analyzer of 0.70 to 0.92, and a weight ratio of the first particle and the second particle is from 1:1 to 1:9.

Advantageous Effects

By using a first particle having relatively high sphericity and a high oxygen content and a second particle having relatively low sphericity in a proper weight ratio, the particles can be smoothly packed in a negative electrode active material layer in a negative electrode according to one embodiment of the present invention, and electrode adhesive strength can be enhanced. Accordingly, deintercalation of the particles of the negative electrode active material layer from a current collector is prevented, and as a result, the electrode preparation process is readily carried out, and performance of a manufactured battery can be improved.

Best Mode

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present specification are for describing illustrative embodiments only and do not intend to limit the present inventive. Singular forms used herein include plural forms as well, unless the context clearly indicates otherwise.

In the present specification, terms such as "include", "provide" or "have" are to specify the presence of features, numbers, steps, constituents or combinations thereof implemented, and need to be construed as not excluding the possibility of presence or addition of one or more of other features, numbers, steps, constituents or combinations thereof.

A negative electrode according to one embodiment of the present invention comprises a current collector and a negative electrode active material layer disposed on the current collector, wherein the negative electrode active material layer includes a first particle and a second particle, the first particle comprises a first core including artificial graphite; and a first shell disposed on the first core, said first shell including an oxide of the artificial graphite, wherein a sphericity of the first particle measured through a particle shape analyzer is from 0.94 to 0.98, the second particle is artificial graphite having sphericity measured through the particle shape analyzer of 0.70 to 0.92, and a weight ratio of the first particle and the second particle is from 1:1 to 1:9.

The first particle may comprise a first core and a first shell.

The first core may be artificial graphite. Artificial graphite has excellent lithium absorption capacity, and when the first core is artificial graphite, charge and discharge properties of a battery may be enhanced.

The first core may have an average particle diameter ($D_{50}$) of 10 μm to 20 μm, and specifically 14 μm to 18 μm. When the first core has an average particle diameter ($D_{50}$) of less than 10 μm, side reactions between a liquid electrolyte and the negative electrode active material layer increases causing a problem of decreasing electrode adhesive strength due to an increase in the specific surface area of the negative electrode active material layer. In addition, the first core having an average particle diameter ($D_{50}$) of greater than 20 μm has a problem of declining output performance of the negative electrode.

Regarding the average particle diameter ($D_{50}$) of the first core, the average particle diameter ($D_{50}$) in the present specification may be defined as a particle diameter at a 50% base of the particle diameter distribution. The average particle diameter ($D_{50}$) may be measured using, for example, a laser diffraction method. The laser diffraction method may generally measure a particle diameter from a submicron region to a few mm, and results of high reproducibility and high resolution may be obtained.

The first shell may be disposed on the first core. Specifically, the first shell may cover a part or all of the first core surface.

The first shell may include an oxide of the artificial graphite. The oxide of the artificial graphite may be a compound produced from an oxidation of the artificial graphite, and an oxygen content of the oxide of the artificial graphite may be higher than an oxygen content of the artificial graphite.

The first shell may have a thickness of 1 nm to 200 nm, and specifically 20 nm to 100 nm. The first shell having a thickness of less than 1 nm has a problem of low electrode adhesive strength. In addition, the first shell having a thickness of greater than 200 nm has a problem of declining battery performance due to an excessive increase in the resistance.

The average particle diameter ($D_{50}$) of the first core and the thickness of the first shell may be measured using a transmission electron microscope (TEM), however, the measurement is not limited thereto.

Sphericity of the first particle measured through a particle shape analyzer may be from 0.94 to 0.98, and specifically from 0.95 to 0.96. The sphericity may mean the major axis to the minor axis of the first particle. The sphericity may be measured through a particle shape analyzer (QICPIC-LIXELL, Sympatec GmbH). Specifically, after deriving sphericity cumulative distribution of the first particles through a particle shape analyzer, sphericity corresponding to 50% in the distribution ratio from particles having large sphericity may be determined as sphericity of the first particle. The measurement method may be the same as the method of measuring sphericity of a second particle and sphericity of a third particle to describe later.

The sphericity may be derived by a sphericalization process in the preparation process of the first particle. The first particle having sphericity of less than 0.94 may cause a problem of low electrode adhesive strength due to an excessively curved surface of the first particle. In addition, the first particle having sphericity of greater than 0.98 may cause a problem of reducing a preparation yield since the first particle is required in large quantities in order to derive high sphericity.

The first particle may have an average particle diameter ($D_{50}$) of 10 μm to 25 μm, and specifically 15 μm to μm. When the first particle has an average particle diameter ($D_{50}$) of less than 10 μm, side reactions between a liquid electrolyte and the negative electrode active material layer increases, and a problem of decreasing electrode adhesive strength may occur due to an increase in the specific surface area of the negative electrode active material layer. In addition, the first particle having an average particle diameter ($D_{50}$) of greater than 25 μm may cause a problem of declining output performance of the negative electrode.

The first particle may have tap density of 0.95 g/cm$^3$ to 1.3 g/cm$^3$, and specifically 1.0 g/cm$^3$ to 1.2 g/cm$^3$. The first particle having tap density of less than 0.95 g/cm$^3$ may cause a problem of low electrode adhesive strength due to an excessively curved surface of the first particle. In addition, the first particle having tap density of greater than 1.3 g/cm$^3$ may cause a problem of reducing a preparation yield since the first particle is required in large quantities in order to derive high tap density. The tap density may be derived by, for example, introducing 40 g of the first particle to a 100 ml cylinder, and then measuring powder packing density after tapping 1000 times. However, the method is not limited thereto.

An oxygen atom content of the first particle may be from 1200 mg/kg to 2500 mg/kg with respect to the total weight, and specifically from 1500 mg/kg to 2000 mg/kg. The oxygen atom content being less than 1200 mg/kg may cause a problem of low electrode adhesive strength. In addition, the oxygen atom content being greater than 2500 mg/kg may cause a problem of declining battery performance due to an increase in the resistance. The oxygen atom content may be measured using an elemental analysis method, and specifically, may be measured through an oxygen nitrogen hydrogen determinator or TPO-MS equipment. However, the method is not limited thereto.

The second particle may be artificial graphite. Artificial graphite has excellent lithium absorption capacity, and when the second particle is artificial graphite, charge and discharge properties of a battery may be enhanced.

Meanwhile, sphericity of the second particle measured through the particle shape analyzer may be from 0.70 to 0.92, and specifically from 0.8 to 0.9. The second particle having sphericity of less than 0.70 may cause a problem of decreased electrode adhesive strength making it difficult to prepare an electrode since the second particle surface has an excessively curved shape. In addition, the second particle having sphericity of greater than 0.92 may cause a problem of reducing a preparation yield since the second particle is required in large quantities in order to derive high sphericity.

The second particle may have an average particle diameter ($D_{50}$) of 10 μm to 25 μm, and specifically 15 μm to 20 μm. When the second particle has an average particle diameter ($D_{50}$) of less than 10 μm, side reactions between a liquid electrolyte and the negative electrode active material layer increases, and a problem of decreasing electrode adhesive strength may occur due to an increase in the specific surface area of the negative electrode active material layer. In addition, the second particle having an average particle diameter ($D_{50}$) of greater than 25 μm may cause a problem of declining output performance of the negative electrode. The method of measuring the average particle diameter ($D_{50}$) of the second particle is the same as the method of measuring the average particle diameter ($D_{50}$) of the first particle.

In the negative electrode active material, the first particle and the second particle may have a weight ratio of 1:1 to 1:9, specifically 1:1 to 1:4, and more specifically 1:1 to 1:3. Satisfying the above-mentioned weight ratio may enhance electrode adhesive strength.

Specifically, when the first particle or the second particle is used too much outside the above-mentioned weight ratio, there are too many voids inside the negative electrode active material layer by morphology of each of the first particles and the second particles. In addition, packing between the first particles and the second particles is not smooth, which may lead to poor adhesive strength between the particles in the negative electrode active material layer, and poor adhesive strength between the negative electrode active material layer and the current collector. Meanwhile, when the first particle and the second particle are properly mixed as in the above-mentioned weight ratio and used, the amounts of the first particle having a shape relatively closer to a spherical shape and the second particle having a relatively curved surface are controlled reducing voids in the negative electrode active material layer, and the first particles and the second particles may be present in a form smoothly engaged to each other. As a result, electrode adhesive strength may be enhanced.

Total weights of the first particles and the second particles may be from 95% by weight to 99% by weight, and specifically from 97% by weight to 98% by weight with respect to the total weight of the negative electrode active material layer.

In the negative electrode, electrode adhesive strength may be from 40 gf/cm to 90 gf/cm, and specifically from 44 gf/cm to 65 gf/cm. The electrode adhesive strength may be measured using the following method. The negative electrode is punched to 10 mm×150 mm and fixed on the center of a 26 mm×76 mm slide glass using a tape, and 180 degree peel strength may be measured while peeling off the current collector using a UTM. The measurement is made 5 times or more, and electrode adhesive strength may be derived from an average of the measured values.

The negative electrode active material layer may further include a conductor. The conductor is not particularly limited as long as it has conductivity without inducing chemical changes to the corresponding battery, and examples thereof may include graphite such as natural graphite or artificial graphite; carbon black such as carbon black, acetylene black, ketjen black, channel black, furnace black, lamp black or thermal black; conductive fibers such as carbon fibers or metal fibers; conductive tubes such as carbon nanotubes; fluorocarbon, aluminum and metal powders such as nickel powder; conductive whiskers such as zinc oxide and potassium titanate; conductive metal oxides such as titanium oxide; conductive materials such as polyphenylene derivatives, and the like.

The negative electrode active material layer may further include a binder. The binder may include at least any one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropylcellulose, regenerated cellulose, polyvinyl pyrrolidone, tetrafluoroethylene, polyethylene, polypropylene, polyacrylic acid, an ethylene-propylene-diene monomer (EPDM), a sulfonated EPDM, styrene butadiene rubber (SBR), fluoro rubber, and polymers substituting hydrogens thereof with Li, Na, Ca or the like, or may include various copolymers thereof.

A negative electrode according to another embodiment of the present invention is similar to the negative electrode of the one embodiment described above, but is different from the one example described above in that the negative electrode active material layer may further comprises a third particle. The difference will be described hereinafter.

The third particle may comprises a second core and a second shell.

The second core may be natural graphite. Natural graphite has a high lithium bonding amount, and therefore, battery capacity may be enhanced when the second core is natural graphite.

The second core may have an average particle diameter ($D_{50}$) of 5 μm to 25 μm, and specifically 9 μm to 20 μm. When the second core has an average particle diameter ($D_{50}$) of less than 5 μm, side reactions between a liquid electrolyte and the negative electrode active material layer increases causing a problem of decreasing electrode adhesive strength due to an increase in the specific surface area of the negative electrode active material layer. In addition, the second core having an average particle diameter ($D_{50}$) of greater than 25 μm has a problem of declining output performance of the negative electrode.

The second shell may be disposed on the second core. Specifically, the second shell may cover a part or all of the second core surface.

The second shell may include an oxide of the natural graphite. The oxide of the natural graphite may be a compound produced from an oxidation of the natural graphite oxidation, and an oxygen content of the oxide of the natural graphite may be higher than an oxygen content of the artificial graphite.

The second shell may have a thickness of 1 nm to 200 nm, and specifically 20 nm to 100 nm. The second shell having a thickness of less than 1 nm may have a problem of excessively low electrode adhesive strength. In addition, the second shell having a thickness of greater than 200 nm has a problem of declining battery performance due to an excessive increase in the resistance.

Meanwhile, sphericity of the third particle measured through the particle shape analyzer may be from 0.94 to 0.98, and specifically from 0.96 to 0.97. When the third particle has sphericity of less than 0.94, an effect of improving electrode adhesive strength may be insignificant. In addition, the third particle having sphericity of greater than 0.98 may cause a problem of reducing a preparation yield since the third particle is required in large quantities in order to derive high sphericity.

The third particle may have an average particle diameter ($D_{50}$) of 7 μm to 25 μm, and specifically 12 μm to 20 μm. When the third particle has an average particle diameter ($D_{50}$) of less than 7 μm, side reactions between a liquid electrolyte and the negative electrode active material layer increases, and a problem of decreasing electrode adhesive strength may occur due to an increase in the specific surface area of the negative electrode active material layer. In addition, the third particle having an average particle diameter ($D_{50}$) of greater than 25 μm may cause a problem of declining output performance of the negative electrode.

The third particle may have tap density of 1.0 g/cm$^3$ to 1.2 g/cm$^3$, and specifically 1.05 g/cm$^3$ to 1.15 g/cm$^3$. The third particle having tap density of less than 1.0 g/cm$^3$ may cause a problem of poor electrode adhesive strength due to an excessively curved surface of the third particle. In addition, the third particle having tap density of greater than 1.2 g/cm$^3$ may cause a problem of reducing a preparation yield since the third particle is required in large quantities in order to derive high tap density. The tap density may be measured using the same method as the method of measuring the tap density of the first particle.

A weight ratio of the first particle, the second particle and the third particle may be 10 to 30:40 to 80:10 to 30, and specifically 20 to 25:50 to 60:20 to 25. Satisfying the above-mentioned weight ratio may further improve electrode adhesive strength since the particles in the active material layer are smoothly packed.

A method for preparing a negative electrode according to another embodiment of the present invention comprises preparing negative electrode slurry (step 1), and coating the negative electrode slurry on a current collector and then drying the result (step 2), wherein the negative electrode slurry includes a first particle and a second particle, the first particle comprises a first core including artificial graphite; and a first shell disposed on the first core, said first shell including an oxide of the artificial graphite, wherein a sphericity of the first particle measured through a particle shape analyzer is from 0.94 to 0.98, the second particle is artificial graphite having sphericity measured through the particle shape analyzer of 0.70 to 0.92, and a weight ratio of the first particle and the second particle is from 1:1 to 1:9. Herein, the first particle and the second particle included in the negative electrode slurry may be the same as the first particle and the second particle included in the negative electrode active material layer described above.

The step 1 may include adding a first particle and a second particle to a solvent and mixing the result (step 1-1). The solvent may be a solvent generally used in the art, and specifically, may be distilled water. In the step 1-1, a binder may be further added and mixed with the first particle and the second particle. Alternatively, in the step 1-1, a conductor and a binder may be further added and mixed with the first particle and the second particle. The conductor and the binder may be the same as the conductor and the binder that may be included in the negative electrode active material layer described above.

The negative electrode slurry may further include a third particle. Specifically, in the step 1-1, a third particle may be added to the solvent with the first particle and the second particle, and mixed. Herein, the third particle included in the negative electrode slurry may be the same as the third particle included in the negative electrode active material layer described above.

A secondary battery according to another embodiment of the present invention may include a negative electrode, a positive electrode, a separator provided between the positive electrode and the negative electrode, and an electrolyte, and the negative electrode may be the negative electrode according to any one of the embodiments described above.

The separator may be used without particular limit as long as it separates a negative electrode and a positive electrode, provides a migration path of lithium ions, and is commonly used as a separator in a secondary battery, and particularly, those having excellent liquid electrolyte moisture retention capacity while having low resistance for ion migration of the electrolyte are preferred. Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer, or laminated structures of two or more layers thereof may be used. Common porous non-woven fabrics, for example, non-woven fabrics made of high melting point glass fiber, polyethylene terephthalate fiber or the like may also be used. In addition, in order to secure heat resistance or mechanical strength, a coated separator including a ceramic component or a polymer material may also be used, and may be selectively used in a monolayer or multilayer structure.

As the electrolyte, an organic-based liquid electrolyte, an inorganic-based liquid electrolyte, a solid polymer electrolyte, a gel-type polymer electrolyte, a solid inorganic electrolyte, a molten inorganic electrolyte and the like capable of being used when manufacturing a lithium secondary battery may be included, however, the electrolyte is not limited thereto.

Specifically, the electrolyte may include a non-aqueous organic solvent and a metal salt.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxy franc, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate or ethyl propionate.

Particularly, among the carbonate-based organic solvents, ethylene carbonate and propylene carbonate that are cyclic carbonate may be more preferably used since they are a highly viscous organic solvent and have a high dielectric constant, and thereby more favorably dissociate a lithium salt in an electrolyte. Mixing and using linear carbonate having low viscosity and low dielectric constant such as dimethyl carbonate and diethyl carbonate to such cyclic carbonate in a proper ratio is more preferred since an electrolyte having higher electrical conductivity may be prepared.

As the metal salt, a lithium salt may be used, and the lithium salt is a material to be favorably dissolved in the non-aqueous liquid electrolyte, and for example, one type selected from the group consisting of F$^-$, Cl$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$ and (CF$_3$CF$_2$SO$_2$)$_2$N$^-$ may be used as an anion of the lithium salt.

With the purpose of enhancing a battery lifetime property, suppressing a battery capacity decrease, enhancing battery discharge capacity and the like, one or more types of additives such as haloalkylene carbonate-based compounds such as difluoroethylene carbonate, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol or aluminum trichloride may be further included in the electrolyte in addition the above-mentioned electrolyte constituents.

According to another embodiment of the present invention, there is provided a battery module including the lithium secondary battery as a unit cell, and a battery pack including the same. The battery module and the battery pack include the secondary battery having high capacity, high rate determining property and cycle property, and therefore, may be used as a power supply of medium to large-sized devices selected from the group consisting of electric vehicles, hybrid electric vehicles, plug-in hybrid electric vehicles and systems for power storage.

Hereinafter, preferred examples will be provided in order to illuminate the present invention, however, the examples are for illustrative purposes only, and it will be obvious to those skilled in the art that various changes and modifications may be made within the scope and technological ideas of the present disclosure, and such changes and modifications also belong to the scope of the attached claims.

EXAMPLE AND COMPARATIVE EXAMPLE

Preparation Example 1: Preparation of First Particle

After mixing artificial graphite having an average particle diameter ($D_{50}$) of 7 μm with a pitch binder, the result was heat treated for 2 hours at 3000° C. to prepare secondary particle-structured artificial graphite having an average particle diameter ($D_{50}$) of 17 μm. After that, the artificial graphite was sphericalized to prepare a preliminary particle using a rotary sphericalization equipment.

The preliminary particle was oxidized under a condition of oxygen atmosphere, 400° C., 0.1 MPa pressure and 60 m³/h air flow to prepare a first particle including a first core and a first shell.

In the prepared first particle, the first core had an average particle diameter ($D_{50}$) of 16.86 μm, and the first shell had a thickness of 70 nm. The average particle diameter ($D_{50}$) of the first core was measured using a particle size analyzer (PSD), and the thickness of the first shell was measured using a transmission electron microscope (TEM). Moreover, sphericity of the prepared first particle measured through a particle shape analyzer was 0.96.

Preparation Example 2: Preparation of Second Particle

After mixing artificial graphite having an average particle diameter ($D_{50}$) of 7 μm with a pitch binder, the result was heat treated for 2 hours at 3000° C. to prepare secondary particle-structured second particle having an average particle diameter ($D_{50}$) of 19 μm. Moreover, sphericity of the prepared second particle measured through a particle shape analyzer was 0.89.

Preparation Example 3: Preparation of Third Particle

After mixing natural graphite having an average particle diameter ($D_{50}$) of 7 μm with a pitch binder, the result was heat treated for 2 hours at 3000° C. to prepare secondary particle-structured natural graphite having an average particle diameter ($D_{50}$) of 16 μm. After that, the natural graphite was sphericalized to prepare a preliminary particle using a rotary sphericalization equipment.

The preliminary particle was oxidized under a condition of oxygen atmosphere, 400° C., 0.1 MPa pressure and 60 m³/h air flow to prepare a third particle including a second core and a second shell.

In the prepared third particle, the second core had an average particle diameter ($D_{50}$) of 15.80 μm, and the second shell had a thickness of 100 nm. The average particle diameter ($D_{50}$) of the second core was measured using a particle size analyzer (PSD), and the thickness of the second shell was measured using a transmission electron microscope (TEM). Moreover, sphericity of the prepared third particle measured through a particle shape analyzer was 0.97.

For each of the first particle, the second particle and the third particle prepared in Preparation Examples 1 to 3, tap density and an oxygen atom content were measured and the results are shown in the following Table 1. Each measurement method is as follows.

Tap Density

The first particle, the second particle and the third particle were each introduced to a 100 ml cylinder in 40 g each, and powder packing density was measured after tapping 1000 times.

Oxygen Atom Content

Using ONH835 Analyzer equipment, an oxygen atom content was measured for a 2 mg sample of each of the first particle, the second particle and the third particle.

TABLE 1

|  | Average Particle Diameter ($D_{50}$) of Particle (μm) | Sphericity | Tap Density (g/cm³) | Oxygen Atom Content (mg/kg) |
| --- | --- | --- | --- | --- |
| First Particle | 17 | 0.96 | 1.1 | 1800 |
| Second Particle | 19 | 0.89 | 0.9 | 244 |
| Third Particle | 16 | 0.97 | 1.14 | 2200 |

Example 1: Preparation of Negative Electrode

Active material particles formed with 1 g of the first particles prepared in Preparation Example 1 and 9 g of the second particles prepared in Preparation Example 2, carbon black as a conductor, and carboxymethylcellulose and styrene butadiene rubber (SBR) as a binder were added to distilled water in a weight ratio of 95.3:1.0:1.2:2.5, and mixed to prepare negative electrode slurry with a 45% mixture solid. The negative electrode slurry was coated on a copper current collector having a thickness of 20 μm with loading of 260 mg/25 cm², and the result was dried to prepare a preliminary electrode. Herein, the temperature of the circulated air was 70° C. Subsequently, the preliminary electrode was roll pressed, dried for 12 hours in a 130° C. vacuum oven, and then punched to a coin cell size of 1.4875 cm² to prepare a negative electrode.

Example 2: Preparation of Negative Electrode

A negative electrode was prepared in the same manner as in Example 1 except that active material particles formed with 3 g of the first particles prepared in Preparation Example 1 and 7 g of the second particles prepared in Preparation Example 2 were used instead of the active material particles of Example 1.

Example 3: Preparation of Negative Electrode

A negative electrode was prepared in the same manner as in Example 1 except that active material particles formed with 2 g of the first particles prepared in Preparation Example 1, 6 g of the second particles prepared in Preparation Example 2, and 2 g of the third particles prepared in Preparation Example 3 were used instead of the active material particles of Example 1.

Comparative Example 1: Preparation of Negative Electrode

A negative electrode was prepared in the same manner as in Example 1 except that active material particles formed only with 10 g of the first particles prepared in Preparation Example 1 were used instead of the active material particles of Example 1.

Comparative Example 2: Preparation of Negative Electrode

A negative electrode was prepared in the same manner as in Example 1 except that active material particles formed only with 10 g of the second particles prepared in Preparation Example 2 were used instead of the active material particles of Example 1.

Comparative Example 3: Preparation of Negative Electrode

A negative electrode was prepared in the same manner as in Example 1 except that active material particles formed with 7 g of the first particles prepared in Preparation Example 1 and 3 g of the second particles prepared in Preparation Example 2 were used instead of the active material particles of Example 1.

Comparative Example 4: Preparation of Negative Electrode

A negative electrode was prepared in the same manner as in Example 1 except that active material particles formed with 0.2 g of the first particles prepared in Preparation Example 1 and 9.8 g of the second particles prepared in Preparation Example 2 were used instead of the active material particles of Example 1.

Experimental Example 1: Evaluation of Electrode Adhesive Strength

For each of the negative electrodes of Examples 1 to 3 and Comparative Examples 1 to 4, the negative electrode was punched to 10 mm×150 mm and fixed on the center of a 26 mm×76 mm slide glass using a tape, and 180 degree peel strength was measured while peeling off the negative electrode current collector using a UTM. As for the evaluation, 5 or more peel strengths were measured, and an average value was determined. The results are shown in the following Table 2.

Experimental Example 2: Evaluation of Cycle Property

Each of the negative electrodes of Examples 1 to 3 and Comparative Examples 1 to 4 was charged until 4.25 V with a constant current (CC) of 0.8 C at 25° C., then charged with a constant voltage (CV) until a charge current became 0.005 C (cut-off current), and this was employed as a first charge. After that, the negative electrode was left unattended for 20 minutes, and discharged to 2.5 V with a constant current (CC) of 0.8 C. This was repeated by 1 to 50 cycles to evaluate a capacity retention rate, and the results are shown in the following Table 2.

The results of Experimental Examples 1 and 2 are shown in the following Table 2.

TABLE 2

|  | Electrode Adhesive Strength (gf/cm) | Capacity Retention Rate@50 Cycle (%) |
| --- | --- | --- |
| Example 1 | 43 | 90 |
| Example 2 | 46 | 89 |
| Example 3 | 63 | 93 |
| Comparative Example 1 | 41 | 88 |
| Comparative Example 2 | 17 | 81 |
| Comparative Example 3 | 41 | 88 |
| Comparative Example 4 | 19 | 83 |

Based on the results, it was seen that the electrode adhesive strength of the negative electrode of Example 1 and Example 2 using the first particle and the second particle in 1:9 and 1:2.33, respectively, and the negative electrode of Example 3 using the first particle, the second particle and the third particle in 1:3:1 was higher than the electrode adhesive strength of the negative electrode of Comparative Examples 1 to 4 satisfying weight ratios outside the range of 1:1 to 1:9. Furthermore, it was identified that the capacity retention rates of Examples 1 to 3 were also higher compared to Comparative Examples 1 to 4.

Moreover, it was identified that Example 3 including the third particle in a proper content had higher electrode adhesive strength and capacity retention rate compared to Examples 1 and 2.

The invention claimed is:
1. A negative electrode comprising:
a current collector; and
a negative electrode active material layer disposed on the current collector,
wherein the negative electrode active material layer includes first particles, second particles and third particles,
each first particle comprises a first core including artificial graphite; and a first shell disposed on the first core, said first shell including an oxide of the artificial graphite, a sphericity of each first particle measured through a particle shape analyzer is from 0.94 to 0.98,
each second particle is artificial graphite having a sphericity measured through the particle shape analyzer of 0.70 to 0.92,
each third particle comprises a second core including natural graphite; and a second shell disposed on the second core, said second shell including an oxide of the natural graphite, and each third particle having a sphericity measured through the particle shape analyzer from 0.94 to 0.98, and
a weight ratio of first particles to second particles is from 1:1 to 1:9.

2. The negative electrode of claim 1, wherein the first particles have an average particle diameter ($D_{50}$) of 10 μm to 25 μm.

3. The negative electrode of claim 1, wherein the first cores have an average particle diameter ($D_{50}$) of 10 μm to 20 μm.

4. The negative electrode of claim 1, wherein each of the first shells have a thickness of 1 nm to 200 nm.

5. The negative electrode of claim 1, wherein the first particles have a tap density of 0.95 g/cm$^3$ to 1.3 g/cm$^3$, wherein the tap density is measured after tapping 1,000 times.

6. The negative electrode of claim 1, wherein the second particles have an average particle diameter ($D_{50}$) of 10 μm to 25 μm.

7. The negative electrode of claim 1, wherein an oxygen atom content is from 1200 mg/kg to 2500 mg/kg with respect to a total weight of the first particles.

8. The negative electrode of claim 1, wherein a total weight of the first particles and the second particles is from 95% by weight to 99% by weight with respect to a total weight of the negative electrode active material layer.

9. The negative electrode of claim 1, wherein a weight ratio of the first particles, the second particles and the third particles is 10-30:40-80:10-30.

10. The negative electrode of claim 1, wherein the third particles have an average particle diameter ($D_{50}$) of 7 μm to 25 μm.

11. The negative electrode of claim 1, wherein the second cores have an average particle diameter ($D_{50}$) of 5 μm to 25 μm.

12. The negative electrode of claim 1, wherein each of the second shells have a thickness of 1 nm to 200 nm.

13. The negative electrode of claim 1, wherein the third particles have a tap density of 1.0 g/cm$^3$ to 1.2 g/cm$^3$, wherein the tap density is measured after tapping 1,000 times.

14. A method for preparing a negative electrode comprising:
preparing a negative electrode slurry (step 1); and
coating the negative electrode slurry on a current collector and then drying the result (step 2),
wherein the negative electrode slurry includes first particles, second particles, and third particles,
each first particle comprises a first core including artificial graphite; and a first shell disposed on the first core, said first shell including an oxide of the artificial graphite, a sphericity of each first particle measured through a particle shape analyzer is from 0.94 to 0.98,
each second particle is artificial graphite having a sphericity measured through the particle shape analyzer of 0.70 to 0.92,
each third particle comprises a second core including natural graphite; and a second shell disposed on the second core, said second shell including an oxide of the natural graphite, and each third particle having a sphericity measured through the particle shape analyzer from 0.94 to 0.98, and
a weight ratio of first particles to second particles is from 1:1 to 1:9.

15. The negative electrode of claim 1, wherein each third particle has a sphericity measured through the particle shape analyzer from 0.96 to 0.97.

* * * * *